Nov. 10, 1942.   O. ARNOLD ET AL   2,301,185
SIGNAL DEVICE
Filed Aug. 24, 1939   2 Sheets-Sheet 1
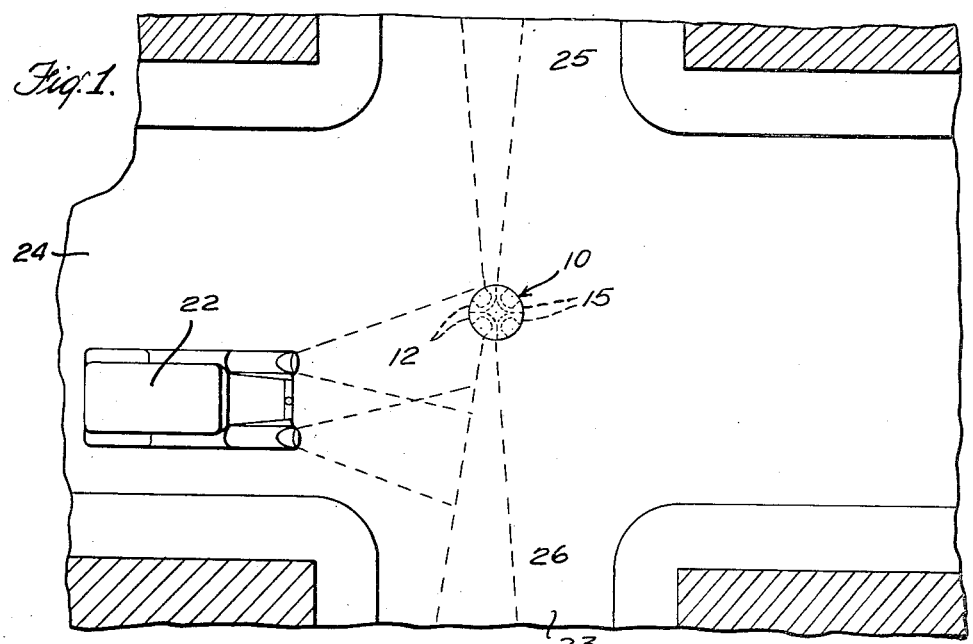
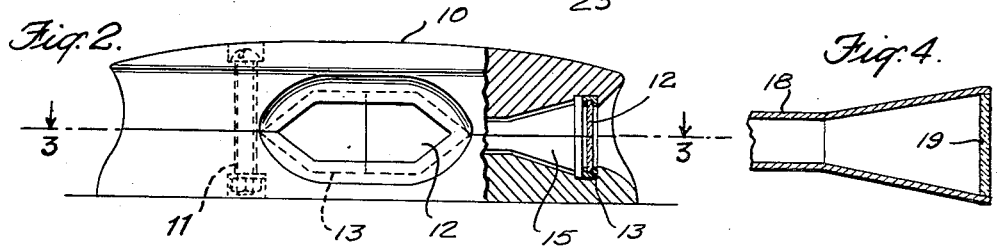
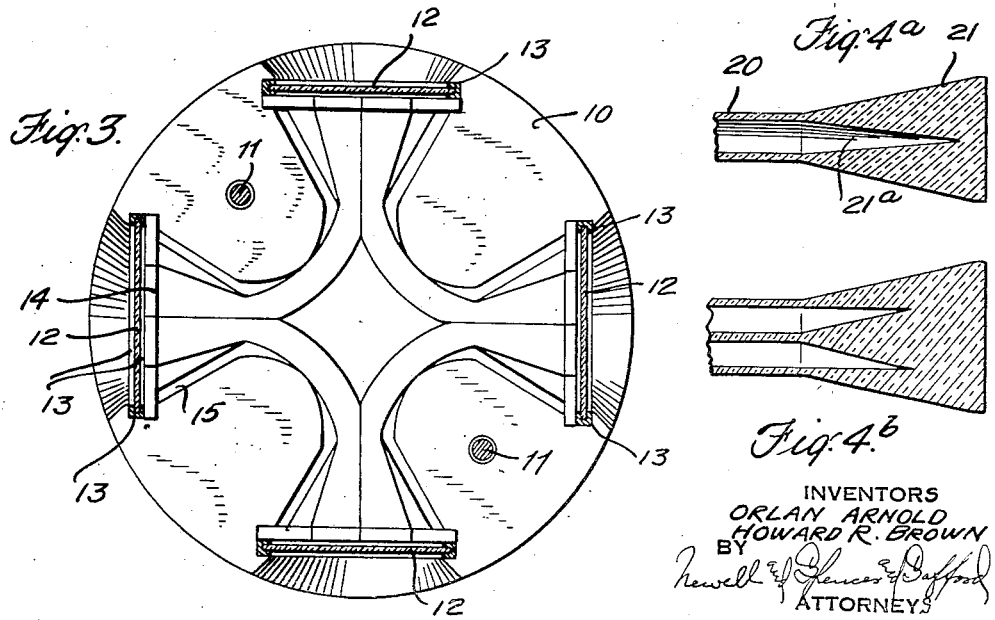
INVENTORS
ORLAN ARNOLD
HOWARD R. BROWN
BY
ATTORNEYS

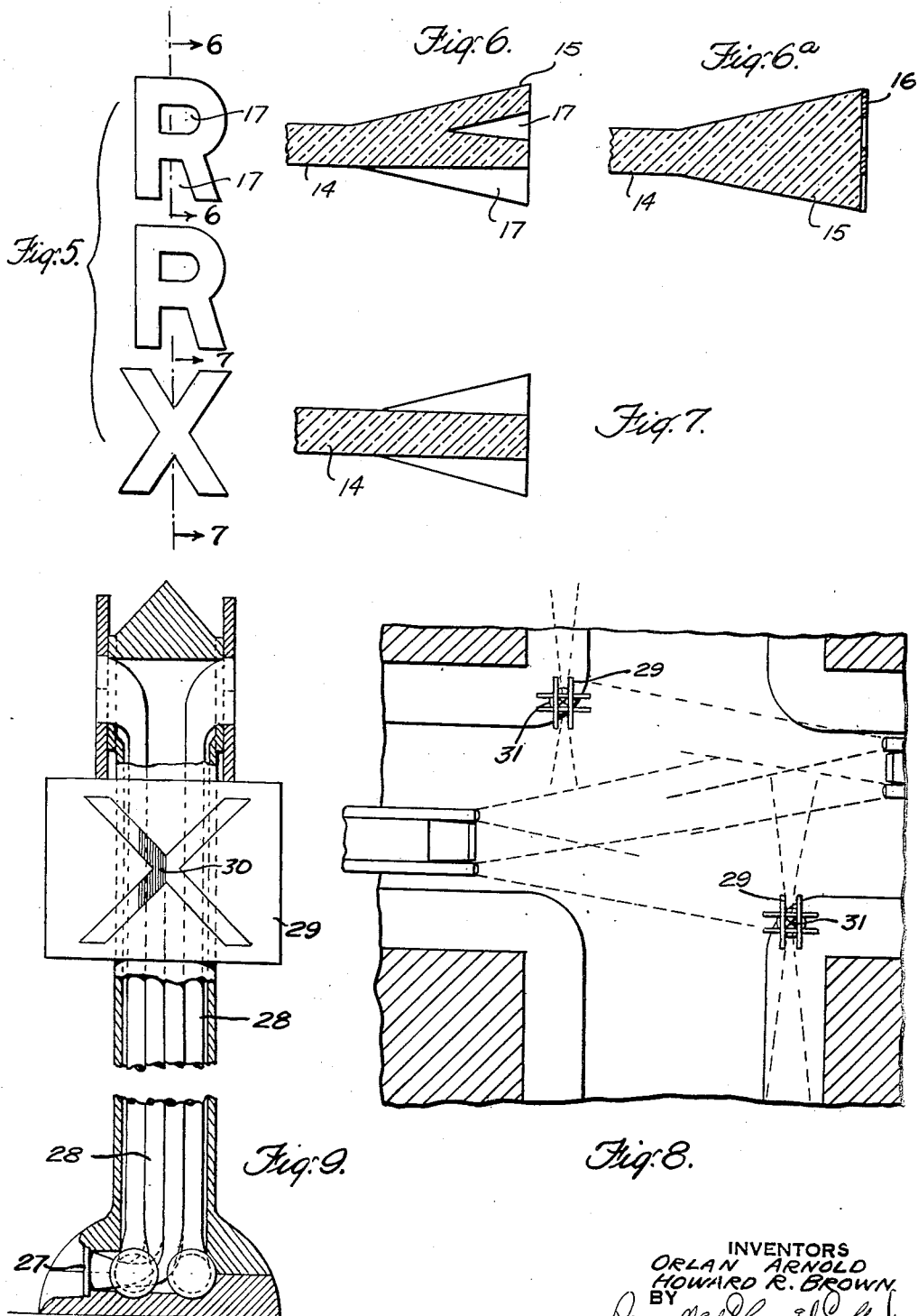

Patented Nov. 10, 1942

2,301,185

UNITED STATES PATENT OFFICE 2,301,185

SIGNAL DEVICE

Orlan Arnold, Troy, N. Y., and Howard R. Brown, Whittier, Calif.

Application August 24, 1939, Serial No. 291,668

10 Claims. (Cl. 88—79)

This invention relates to a signal device and more particularly to a device adapted for signalling the approach of a lighted vehicle in a direction transverse to its direction of approach, as, for example, at highway intersections.

One of the serious causes of highway accidents (in this application we shall use the term "highway" to include all traffic arteries, such as streets, roads, railway lines, etc.) has been the unobserved approach of vehicles along intersecting highways, particularly where the view of one highway from the other is intercepted and where the highways approach one another at a more or less acute angle so that the headlights of one vehicle are not apparent to the driver of the other vehicle.

It is an object of our present invention to provide a simple device for preventing such accidents and for warning the respective drivers of vehicles approaching such an intersection that another vehicle is approaching.

Another object of the invention is to provide such a device in which no fixed lights or mechanical devices are required, so that the intended warning may be entirely reliable without servicing of the warning device.

Another object of our invention is to provide a device which gives a distinctive warning which can be recognized as indicating approach of another vehicle to the intersection, and distinguished from other reflector type signals indicating lanes of traffic, warnings of curves, hills, intersections, etc.

Other objects of the invention will appear from the following description and need not be mentioned here in detail.

Prior to our present invention numerous reflection type signals using light emanating from the vehicle itself have been designed and put into extensive use to give warning or direction signals, etc. One of us has previously suggested and demonstrated the use of reflector signals at highway intersections for the purpose of giving a signal along one of the intersecting highways from a light carried by a vehicle approaching along the other. Tests with such reflector signals, however, have demonstrated that these cannot be satisfactory under all conditions for intersection signals, and the present invention, therefore, constitutes an important improvement and advance over practice and knowledge of the art prior to the present invention.

According to this present invention a light conducting pipe (within which term we shall include, in this application, elongated light conductors through which light passes with or without reflection along the wall surfaces, whether in the form of elongated bodies of solid transparent material or a hollow tube whether transparent or opaque with reflecting walls) which pipe has one end directed along one highway and the opposite end directed along another highway, so that light received from a headlamp or other light source carried by a vehicle approaching along one highway will be conducted to and emitted along the direction of approach along the other highway.

In the accompanying drawings we have shown a preferred embodiment of our invention and various modifications thereof. These and the following specification are given with a view to illustrating the invention and explaining the principles thereof and are not intended to be exhaustive nor limiting of the invention, but on the contrary are intended to enable others skilled in the art to embody and utilize the invention in numerous forms and with numerous modifications, each as may be best adapted to the requirements of a particular use.

In these drawings:

Fig. 1 is a diagrammatic plan view showing the effective use of my invention in signalling at highway intersections;

Fig. 2 is a view in side elevation of a device such as that shown diagrammatically in Fig. 1;

Fig. 3 is a view in horizontal section taken on line 3—3 of Fig. 2;

Figs. 4, 4a and 4b are fragmentary sectional views of an end portion of modified embodiments of my invention;

Fig. 5 is a view in end elevation of another modification;

Figs. 6 and 6a are views in section taken on line 6—6 of Fig. 5 of alternative structures;

Fig. 7 is a view taken on line 7—7 of Fig. 5;

Fig. 8 is a diagrammatic plan view similar to Fig. 1, but showing a modified form of the invention; and Fig. 9 is a view in vertical section of an embodiment suitable for use in Fig. 8.

Referring first to Figs. 1, 2 and 3, the embodiment of our invention there shown comprises a roughly domed-shaped housing 10, e. g., a casting, adapted to be anchored to the pavement and advantageously made in two sections, bolted at 11, or otherwise secured together, along the plane indicated by the line 3—3, and as shown in plan in Fig. 3.

In the upper half of this section are windows directed toward the several converging highways of the intersection. These windows in the embodiment shown are each closed by a pane of hard glass 12, adapted to resist etching by mud and dust which may be blown along the road or thrown up by traffic, and these are advantageously mounted in the housing 10 in gaskets 13 of rubber or other yieldable material. Behind each window are the ends of two light conducting pipes 14 which are pressed against and advantageously sealed to the window 12. The pane of glass may be omitted, if desired, and the ends of the pipes 14 exposed directly. Etching at this point may decrease efficiency but will not destroy the usefulness of the device.

These pipes 14 respectively are bent in opposite directions so that each conducts light incident upon the window at one end to and emits it along the opposite directions respectively of an intersecting highway.

In a preferred embodiment of my invention, these light conducting pipes 14 are made in the form of Lucite rods having more or less funnel-shaped ends as shown in Fig. 3. Due to the relatively high index of refraction and consequent low critical angle of total internal reflection, the light entering at one end of the rod will be reflected internally within the pipe and emitted from the opposite end with relatively little loss though the sides of the pipe, but to secure full advantage of this effect it is important that the exterior surfaces of the Lucite be in air or other medium having low index of refraction. For this reason the pipes have only the minimum contact with the housing 10 which is necessary for support. The contact area may be silvered or covered with a reflecting foil, but ordinarily that need not be done if the area is small. Likewise, due to the high transparency of the Lucite material, the light will be transmitted through the pipe with relatively little loss due to absorption.

The funnel-shaped ends 15 used in this preferred embodiment serve to concentrate the light beam by taking a relatively large area and condensing it by internal reflection into the smaller area of the central bent portion of the pipe. The result of this, depending upon the angle of the funnel and any dispersing means may be to give a more intensely lighted central spot on the signal end of the pipe than is incident upon the receiving end of the pipe. Another advantage of this construction is that it is possible to bend the smaller rod on an arc of shorter radius than would be practicable if the rod were made throughout of the full diameter of its ends. Notwithstanding these advantages, however, it is within the scope of our invention to use a rod or other pipe of uniform diameter.

In the case illustrated in Fig. 3, each pipe is separate from the others and assembled into the cross form as shown, but if desired the entire cross may be molded in a single piece, the contacting ends being integral with no reflecting surface between them. The common ends of the pipes will be divided near the center of the cross and a part of the light will go in each direction through the bent portion of the separate pipes.

The ends 15 of these light conducting pipes may be made in any desired form, bearing in mind, however, that the angular relationship of the side surfaces to one another should be chosen so as to produce high total internal reflection. These ends may take the form of a simple circle or they may be elliptical or advantageously they may be formed so as to point towards the side as shown for example in Fig. 2. Thus, the illumination of one side or the other will give an illuminated arrow indication toward the direction from which the vehicle is approaching. Numerous other forms may be used and the window 12 may be colored, e. g., with a ruby or amber or other color or combination of colors to give a distinctive warning signal. This may be by a color plate or film over one or both ends as at 12 or a suitable dye or coating may be taken up or integrally applied to the end of the pipe, or even to the material of the pipe throughout. Luminescent materials may also be used to give color to the signal.

For special purposes other forms may be given to the illuminated signal for example by use of a mask or etched portion, as for example, of opaque or diffusing or distinctively colored areas as indicated for example at 16 in Fig. 6a, or by cut-out portions as indicated in Fig. 6, whereby the light is conducted by total internal reflection along the remaining portion so as to give the illuminated character with the darker areas where the material is cut away as shown at 17 in Fig. 6, or by flattening, denting, or otherwise forming the end portions of a tubular pipe.

The increased intensity in the signal area which results from the funnel-like ends is a distinct advantage, since even though relatively smaller in area it gives a more commanding signal.

In the case illustrated in Figs. 5, 6 and 6a, the signal is intended for use at a railroad crossing and in this case parallel light conduction pipes are provided, each terminating at the signal end in the distinctive character "R," "R," "X." The receiving end of this device would be placed close to the track where it would receive light from the headlamp of a locomotive approaching on the railroad and thus would provide an effective signal not dependent upon servicing and substantially immune to failures of all kinds.

Other distinctive signals for various purposes can be formed in the same way, and instead of forming a single pipe, bundles of smaller pipes may be used, each of size, form and position to form one portion of the signal.

In Fig. 4, we have shown a hollow light conducting pipe. In this case the pipe takes the form of a hollow metallic tube 18, having a window 19, e. g., of Lucite, molded or cemented or otherwise sealed to or over the ends of the tube. The interior surface of the tube is advantageously silvered or polished to provide a highly efficient reflecting surface. In this case the light entering through the window 19 is reflected along the interior of the tube in much the same way as in the Lucite rod 14 as shown in Fig. 3.

In Fig. 4a, we have shown another type of hollow tube which may be used as a light conduction pipe. In this case a Lucite tube 20 is welded, e. g., by fusion or solution, to a cast or molded Lucite end piece 21 which is provided with a conical recess 21a. Total internal reflection along the external and internal conical faces of the molded end piece 21 results in a concentration within the wall of the Lucite tube 20 of light incident upon the end. The light thus concentrated passes along the tube by total internal reflection in the same manner as within the rod 14. This arrangement is intended primarily to save material, which may be costly, without requiring such a long tapering end piece, which may be important where a short distance is available between the windows 12. This will, however, produce a distinctive effect in that the light being concentrated within the tube 20 will appear at the signal end with a more intense ring and a shading off in intensity towards the center and the edges of the end. If the tube is flattened or formed into an arrow or other distinctive shape this intense area may give a distinctive character to the signal. Such a tubular device may also be combined with an internal rod, e. g., of the type shown in Figs. 1–3, passing through the hollow interior of the tube. This may be integrally connected by the end piece, e. g., as shown in Fig. 4b. This gives a distinctive distribution of light in the signal which may be more desirable in some cases.

When the receiving ends of the light conduction pipe are funnel-shaped, as shown for example in Figs. 3, 4, 5, 7 and 9, it is, of course, important that the angle of the conical face should be sufficiently long so that the single or multiple reflections occurring within the conical end portion will not reflect back too much light; but it may be desirable to choose this angle so that a small amount of light is reflected back along the same highway from which it is received, thus giving a low intensity signal as a warning of the intersection which changes to a high intensity upon the approach of a vehicle along the intersecting highway.

In Fig. 1, we have illustrated diagrammatically the use of the device as described above.

In this case the automobile indicated at 22 is approaching the intersection 23 along the highway 24. The beams from its headlamps, as indicated by the light broken lines, fall upon the intersection signal 10 and pass into the window 12 faced toward the highway 24 and, after transmission through the light conducting pipe 14, not shown in this figure, the light from the headlamp of the car 22 is emitted through the window 12 on opposite sides of the signal 10 and along the opposite highways 25 and 26 so that any car approaching along either 25 or 26 will be warned of the approach of the car 22. Likewise, of course, the headlamps from any car approaching along 25 or 26 falling upon the signal 10 would result in an illuminated signal toward the car 22, and thus give warning of the approach of a car along the intersecting road.

In Figs. 8 and 9, we have shown a curb type signal. In this case, instead of mounting the signal device in a dome on the pavement itself, the signal is contained within a post at the side of the highway. In this case the light conduction pipes are intended to pass light only in one direction. The inlet at 27, therefore, is placed low along the curb so as to fall within the high intensity portion of the beam from an automobile headlight. The pipe 28 runs up through the interior of the post to the center of a crossing warning sign 29 and is formed, as shown at 30, into a distinctive illuminating signal. Advantageously, each of the posts 31 has windows 27 placed to receive light from two directions respectively and each placed so that it always receives the light from a vehicle approaching along the same side of the road. The light received from each direction, however, is conducted through two pipes or pipe portions to opposite sides so as to be emitted in opposite directions along the intersecting highway as clearly illustrated in Fig. 8.

It is an important advantage of the type of signalling device embodying our present invention that the light which is received in a substantially parallel beam is emitted with a "shot-gun" effect rather than a "rifle" effect. That is to say, there is a scattering of light within an angular range sufficiently small so that the intensity of the signal is not lost but substantially the full scope of the road may be covered effectively. In this respect the signal is superior to any simple mirror or prism reflector device or other accurate optical system on the one side or any diffusing system on the other side.

Although we refer particularly to the use of Lucite, which is the trade-mark under which methyl methacrylate resin is sold, it will be understood that numerous other materials may be used. Quartz which is most closely similar in its optical properties to Lucite may be used, but for most purposes will be unduly expensive. Likewise, glasses of high refractive index may be used in a similar manner and other transparent resins. In some cases it may be desirable to use a glass tube filled with a transparent liquid of high refractive index, such for example as cyclic unsaturated halogenated organic compounds, and in general liquids which have high transparency and reasonably low vapor pressure and other suitable physical and chemical properties to assure stability and efficiency.

Although we have shown only two examples of the use of the invention, and both with right angle intersections, it will be understood from what has been said above that one of the advantages of the signals embodying our invention is that they are easily adapted to numerous different types of mountings and locations and to highways approaching at any angle and in any number, as for example 5, 6, or more point intersections, as well as Y, T and X intersections and mere curves.

A metal tube may also be combined with Lucite or any other transparent material of high refractive index by filling the tube with such material which assures the preservation of the reflecting surfaces. I have found, however, that in such case very high efficiency may be attained if the tube is silvered inside and sealed and evacuated or filled with a low pressure of an inert gas which likewise will protect the reflecting surfaces while giving a minimum absorption of light as it passes through the tube.

What we claim is:

1. A traffic signal device which comprises a protective housing adapted to be fixedly mounted at the conjunction of angularly related highway lanes, a window in said housing facing the direction of approaching traffic on at least one of said lanes, said window being below the upper level of a normal headlight beam of vehicles approaching along said lane, a second window facing the direction of approaching traffic on another of said lanes, and a curved light conduction pipe of transparent material having high index of refraction with respect to the medium surrounding it, having end surfaces positioned at said windows and facing respectively the approaching traffic of said lanes and polished side surfaces and being smoothly curved between said windows, whereby to conduct light by transmission and internal reflection from one end of said pipe to and through the other.

2. A traffic signal as defined in claim 1, in which the light conduction pipe is a solid bar of clear methyl methacrylate resin.

3. A signal for highway crossings and the like which comprises a plurality of light conduction pipes converging in paired ends each occupying one-half of a window opening whereby light entering said window is divided and conducted and emitted a part in each of opposite directions on the highway whereas light received at either of said opposite ends from along said highway will be conducted to and emitted from said first-named window, and a housing for positioning and protecting said light conducting pipes, having windows therein at the ends of said light conduction pipes and having thereon means for anchoring it in fixed relation to the highway crossing; said light conduction pipes being sealed dust-tight near said windows, whereby dust and abrasion are prevented from destroying the efficiency of light conduction along said pipe.

4. A traffic signal device which comprises, a protective housing adapted to be fixedly mounted at the conjunction of angularly related highway lanes; a window in said housing facing the direction of approaching traffic on at least one of said lanes; a second window facing the direction of approaching traffic on another of said lanes; and at least one light conduit lying wholly within said housing connecting said windows and having end surfaces thereat respectively facing traffic on said lanes; said conduit being characterized by defining surfaces of high reflective capacity, by a low capacity for light absorption, by a short bend therein encompassing the angle between said lanes and by being gradually reduced in cross-sectional area from the faces to a minimum at the zone of bend so that the radius of curvature of said bend is substantially greater than the diameter of said conduit at the bend.

5. A traffic signal as defined in claim 4 further comprising reflectors positioned in the housing facing each lane of traffic and adapted to throw light from that lane back along substantially the same lane, and means associated with the light conduit to give the light delivered therefrom an appearance distinctive from that of the light returned by said reflectors.

6. A traffic signal device which comprises, a protective housing, adapted to be fixedly mounted at the conjunction of angularly related highway lanes, a window in said housing facing the direction of approaching traffic on at least one of said lanes, a second window facing the direction of approaching traffic on another of said lanes, each of said windows being adapted to have light from said lanes directed thereagainst simultaneously, and a light conduit connecting said windows, said conduit being characterized by defining surfaces of high reflective capacity and by a low capacity for light absorption and being bent to connect the two windows, the conduit terminating in transparent faces parallel to and closely adjacent the windows, at least one of the faces having a light receiving area greater than the cross-sectional area of the conduit at the point of bend and at least the other of said faces through which light escapes from the conduit being of distinct configuration, the walls of the conduit approaching distinctive faces at a variety of angles to the axis of the conduit whereby cross reflection is minimized, so that approaching traffic can readily distinguish a transmitted signal by the marked increase in intensity.

7. A traffic signal as defined in claim 4 in which the light conduit is a hollow tube having smooth highly reflecting internal surfaces and transparent ends sealed thereon.

8. A traffic signal device which comprises, a protective housing adapted to be fixedly mounted at the conjunction of angularly related highways, a window in said housing facing the direction of approaching traffic on at least one of said lanes, a second window facing the direction of approaching traffic on another of said lanes, a light conduit connecting said windows, said conduit being characterized by defining surfaces of high reflective capacity and by low capacity for light absorption and being bent to connect the two windows, the conduit terminating in transparent end surfaces positioned at said apertures, the cross-sectional area of said conduit being greater adjacent the end surfaces than at the point of bend, and a color filter in the zone of lesser cross-sectional area, whereby any light reflected from a source directed toward one of the windows may be readily distinguished from light passing through the conduit to said windows by difference in color.

9. A traffic signal device as claimed in claim 1 in which the windows are of hard glass and further comprising means for sealing said windows in dust-tight relation to the housing.

10. A traffic signal device as claimed in claim 1 in which said second window is at a level above that of a normal headlight beam approaching said first named window.

ORLAN ARNOLD.
HOWARD R. BROWN.